Figures 1, 2:
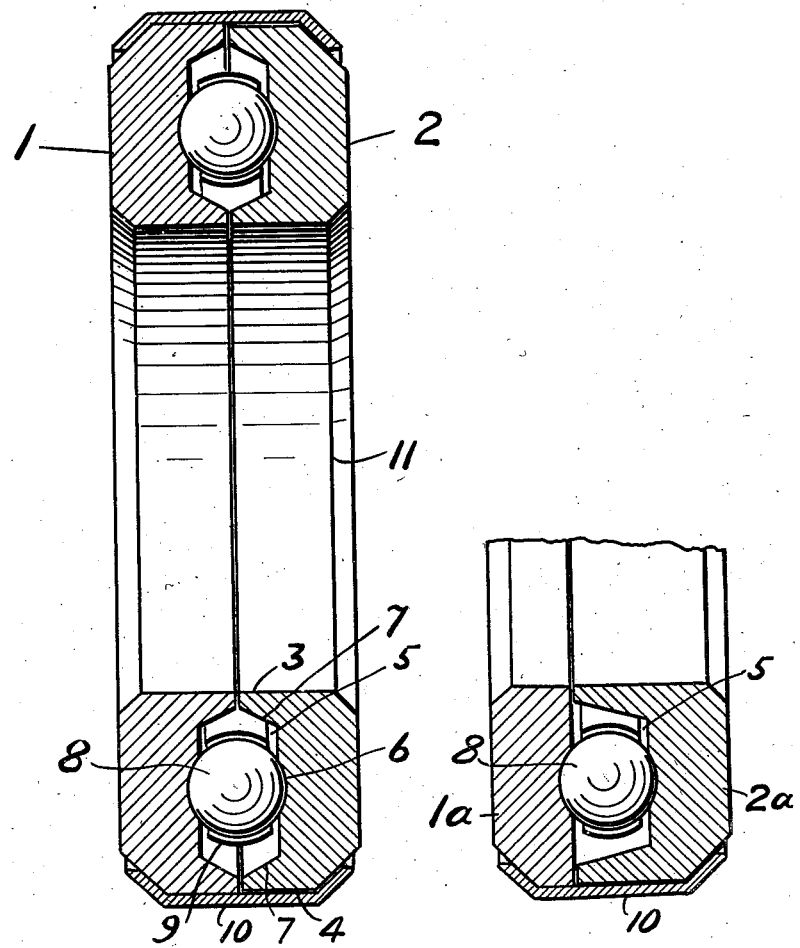

April 12, 1932.   J. M. ENGLISH   1,853,675
THRUST BEARING
Filed May 31, 1930

WITNESS:
Rob't R. Kitchel

INVENTOR
John M. English
BY
Augustus B. Stoughton
ATTORNEY.

Patented Apr. 12, 1932

1,853,675

UNITED STATES PATENT OFFICE

JOHN M. ENGLISH, OF PHILADELPHIA, PENNSYLVANIA, ASSIGNOR TO NICE BALL BEARING COMPANY, OF PHILADELPHIA, PENNSYLVANIA, A CORPORATION OF PENNSYLVANIA

THRUST BEARING

Application filed May 31, 1930. Serial No. 457,969.

The principal object of the present invention is to provide a self-lubricating and self-contained thrust bearing which, while efficient and reliable in use, can be manufactured comparatively inexpensively.

A further object of the invention is to provide a thrust bearing of this character which is particularly adapted for use in the automotive industry in clutches, transmissions, rear axle differentials and the like where intermittent and relatively great thrusts are encountered, my improved thrust bearing comprising means affording auxiliary bearing surfaces for sustaining unusually heavy or oblique thrusts but which are inoperative under normal conditions for this purpose.

A still further object of the invention is to provide an anti-friction thrust bearing embodying means operative to prevent excessive compression of the anti-friction elements under unusual conditions to thereby prevent breakage thereof or damage thereto.

The invention will be claimed at the end hereof but will be first described in connection with the embodiment of it chosen for illustration in the accompanying drawings forming part hereof and in which Figure 1 is a transverse sectional view of a thrust bearing embodying features of the invention, and Fig. 2 is a similar view of a modification.

Referring to the drawings, and more particularly to Fig. 1, 1 and 2 are confronting rings or washers. In the inner face of each ring and spaced from its inner and outer peripheries 3 and 4, is an annular cavity 5, and in the bottom of the cavity 5 there is provided an annular ball groove 6. The end walls 7 of the cavity 5 may be regarded as dams projecting from the inner faces of the rings. 8 is a circular row of balls arranged in the pocket provided by the cavity and disposed in the grooves 6 of the rings 1 and 2. 9 is a cage for the balls. 10 is a peripherally arranged band overlapping the rings, and sufficient clearance is provided between the band 10 and one of the rings, so that the rings are independently rotatable, this clearance, as well as the clearance between the dams 7 of the respective rings or races being exaggerated in the drawings for convenience of illustration. The axial bore 11, which is beveled at the outer edges of the rings, receives a shaft on which the bearing is supported in the ordinary way, this bore customarily being slightly larger in one of the rings than in the other so that when the latter is fitted tightly to the shaft the other ring may freely rotate with respect thereto. The pocket formed by the cavities 5 or by the dams 7 of the rings 1 and 2, contains grease. The dams 7 or portions of the rings between the inner and outer peripheries 3 and 4, and the cavities 5 serve to oppose the escape of grease.

The clearance between the proximate dams of the rings when the bearing is not subjected to endwise thrust is just sufficient to permit free relative rotation between the rings on the balls 8, but without any frictional contact between the rings themselves and in bearings of the sizes ordinarily used in automobile clutches and the like, this clearance is desirably about .004″ more or less and thus the major portion of the lubricant within the cavity 5 is retained therein, the escape therefrom of sufficient lubricant to maintain an adequate film thereof between the juxtaposed faces of the dams being permitted by the clearance between them.

As is well known in the art, the hardened steel of which anti-friction balls and races are ordinarily made, is somewhat elastic; it is therefore apparent that when the bearing of my invention is subjected to a relatively heavy axial thrust, the balls 8 and the races 1 and 2 will be slightly compressed along diameters of the several balls parallel to the axis of the bearing. When an excessively heavy load is applied to the bearing, therefore, the clearance between the opposed faces of the dams 7 of the respective rings is taken up and said faces are brought into contact and thus sustain a portion of the load and prevent further compression of the balls, so that damage thereto and scoring or other injury of the raceways through penetration thereinto of the balls are prevented. Similarly, when for any reason the load on the thrust bearing is unevenly distributed about the raceways, as when the fingers of a clutch in which the bearing is employed are unequally adjusted, the dams 7 contact adjacent the portions where the heaviest load is applied and prevent material disalignment of the bearing and excessive side thrust as a result of the non-uniform distribution of the load.

Additionally in use centrifugal force aided by the dams opposes the escape of grease at the inner part of the rings, and the band 10 and restricted character of the clearance between the band 10 and the ring 2, aided by the dams, opposes escape of grease at the outer part of the rings; as this clearance is just sufficient to permit free rotation between the ring and the band but very little grease can work therethrough when the bearing is in use so that by packing the cavity 5 with grease when the bearing is initially assembled, adequate lubrication of all the working parts thereof is assured for an extended period and one usually commensurate with the operative life of the bearing It may be remarked that the grease is of high melting point of which 295° F. is an example.

It is an advantage that the lubricant pocket is built ino the rings, so that no additional members or elements are necessary to form the pocket while sufficient space is provided to permit free floating rotation of the cage or retainer 9 which maintains the balls in spaced relation to prevent rolling contact between adjacent balls.

The number of rows of balls or ball grooves may be increased without otherwise altering the design of the structure, and rollers can be substituted for balls.

The construction and mode of operation of the modification shown in Fig. 2, are as above described, except that one ring 1ª is without dams and all of the dams are provided on the other ring 2ª, from which it is evident that all of the cavity can be provided in one ring, or one-half, or other part, of it in one ring and the remainder in the other.

An additional advantage of my invention, particularly in the form shown in Fig. 1, arises from the added rigidity of the races which results from the presence of the dams 7 integral therewith, and it is apparent from Fig. 1 that when the rings are subjected to a torsional twist or strain the dams 7 resist such strain in a manner substantially similar to that in which like strains are resisted in a channel section beam by the flanges thereof.

I claim:

1. A thrust bearing comprising a pair of annular rings having opposed grooves adapted to receive anti-friction elements, a plurality of anti-friction elements disposed in said grooves and adapted to rotate therein, means engaging all of said anti-friction elements operative to maintain said elements in annularly spaced relation, and an integral annular rib carried by one of said rings radially outwardly of said spacing means and normally out of contact with the other ring but adapted to engage said ring when said anti-friction elements are subjected to a predetermined degree of deformity under compression.

2. A thrust bearing comprising a pair of relatively rotatable opposed annular rings, each of said rings having a groove therein adapted to receive anti-friction elements, anti-friction elements disposed between said grooves and adapted for rolling movement therein upon relative rotation of said rings, a rib integral with each of said rings and radially spaced from the groove therein, said ribs being operative to retain lubricant in the vicinity of said anti-friction elements and adapted for mutual sliding interengagement upon predetermined compression of said elements.

3. A thrust bearing comprising a pair of rings, each provided in one of its faces with an annular groove, said rings being axially aligned and oppositely disposed whereby said grooves define an annular chamber, a series of balls disposed therein, a retainer in said chamber adapted to maintain said balls in annularly spaced relation, the juxtaposed faces of the rings adjacent the grooves being normally maintained by the balls in slightly spaced relation but adapted when said balls are deformed to a predetermined extent by substantially axially directed pressure on the rings, to contact each other and limit further deformation of the balls.

JOHN M. ENGLISH.